Patented Apr. 22, 1930                                1,755,193

UNITED STATES PATENT OFFICE

LEO SCHLECHT, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF ACETONE

No Drawing. Application filed November 23, 1928, Serial No. 321,522, and in Germany December 16, 1927.

In the application for Patent Ser. No. 304,834, filed September 8th, 1928, I have described a process for the production of acetone from acetylene and steam at an elevated temperature by means of a catalyst, the time of contact of the gases being kept longer than is employed for the production of acetaldehyde, the said catalysts containing metals, or compounds of the same, the acetates of which decompose with the formation of acetone when heated.

I have now found that good yields of acetone are also obtained by passing a mixture of acetaldehyde and steam, instead of the mixture of acetylene and steam employed in accordance with the said application, over such catalysts as are specified in the said application and contain zinc or compounds thereof. For example, very good yields of acetone can be obtained with catalysts comprising oxids, carbonates or acetates of zinc and tin or aluminium or heavy metals or compounds of the aforesaid metals or basic salts of such metals or any other compounds thereof as become converted into oxids, carbonates or acetates or basic salts during the reaction. Natural substances, such as calamine, bauxite and the like, or mixtures of the aforesaid substances may also be used.

Suitable additions are, for example, vanadium pentoxid, manganese dioxid and chromium-thallium compounds and additions of one or more of the oxids of the alkaline earth metals or of aluminium or magnesium are particularly efficient. Catalysts which may have become sluggish or spent may be easily regenerated by an oxidizing treatment, for example, by heating in a current of moist air.

The most suitable temperature for the reaction depends on the nature of the catalyst employed and on the condition of its superficial area, and is, generally speaking, between 400° and 450° C., but even at a lower temperature, such as about 350° C. or up to about 500° C. satisfying results can be obtained. The relative proportion of acetaldehyde to steam is preferably less than 1:1. The steam may be partially or nearly completely replaced by oxygen, air or other gaseous mixtures containing oxygen.

In order to prevent polymerization and decomposition of the resulting acetone, the reaction mixture should be passed over the catalyst not too slowly. To prevent overheating in the reaction chamber, which would also lead to loss of acetone, the reaction compounds are preferably preheated, either separately or in admixture. Moreover, a good distribution of the heat in the reaction chamber can also be ensured by depositing the catalyst on carriers of materials which are good conductors of heat, such as aluminium rings.

The hot mixture of gas and vapor issuing from the reaction chamber is passed, for example, through a column still, this treatment separating the acetone from surplus water and also from carbon dioxid and hydrogen.

The following examples will further illustrate the nature of the said invention which, however, is not limited thereto. The parts are by weight.

Example 1

A mixture of 1 part of acetaldehyde and 4 parts of steam is passed through an aluminium tube which is charged with zinc oxid heated to 400° C. When the vapor mixture is passed at the rate of about 250 liters per hour, for 1 liter of catalyst, the yield of acetone obtained is more than 90 per cent of the amount calculated in accordance with the equation

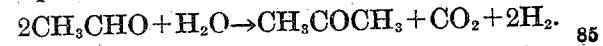
$2CH_3CHO + H_2O \rightarrow CH_3COCH_3 + CO_2 + 2H_2$.

The gas remaining after the condensation of the vapors of acetone and water contains, on the average, 22 per cent of carbon dioxid and about 70 per cent of hydrogen, together with small amounts of carbon monoxid and hydrocarbons, and may be further employed for various purposes after, if so desired, the elimination of the carbon dioxid.

Example 2

An aqueous solution of 30 per cent aqueous acetaldehyde is vaporized in a preheater and the vaporous mixture is passed at about 410° C. over a catalyst prepared by mixing precipitated aluminium oxid and zinc oxid. On passing the vapors of 0.3 liter of the aforesaid solution over 1 liter of catalyst per hour, 93 per cent of the aldehyde is converted into acetone.

*Example 3*

Under the conditions described in the foregoing example, but by employing a catalyst consisting of a mixture of aluminium rings and zinc carbonate a yield of 95 per cent of acetone calculated on the amount of aldehyde employed is obtained.

What I claim is:

1. The process of producing acetone, which comprises passing acetaldehyde together with steam at a temperature between about 350° and 500° C. over a catalyst containing zinc.

2. The process of producing acetone, which comprises passing acetaldehyde together with steam at a temperature between about 350° and 500° C. over a catalyst containing zinc and another metal the acetate of which decomposes under the said conditions.

3. The process of producing acetone, which comprises passing acetaldehyde together with steam at a temperature between about 350° and 500° C. over a catalyst comprising a compound of zinc.

4. The process of producing acetone, which comprises passing acetaldehyde together with steam at a temperature between about 350° and 500° C. over a catalyst comprising a compound of zinc and another metal the acetate of which decomposes under the said conditions.

5. The process of producing acetone, which comprises passing acetaldehyde together with steam at a temperature between about 350° and 500° C. over a catalyst comprising a compound of zinc and an oxid of an element selected from the group consisting of the alkaline earth metals, aluminium and magnesium.

6. The process of producing acetone, which comprises passing acetaldehyde together with steam at a temperature between about 400° and 450° C. over a catalyst comprising zinc oxid.

7. The process of producing acetone, which comprises passing acetaldehyde together with steam at a temperature between about 400° and 450° C. over a catalyst comprising zinc oxid and another metal the acetate of which decomposes under the said conditions.

8. The process of producing acetone, which comprises passing a mixture of acetaldehyde and a quantity of steam greater than that of the acetaldehyde employed at a temperature between about 350° and 500° C. over a catalyst containing zinc.

9. The process of producing acetone, which comprises passing a mixture of acetaldehyde and a quantity of steam greater than that of the acetaldehyde employed at a temperature between about 400° and 450° C. over a catalyst comprising a compound of zinc.

10. The process of producing acetone, which comprises passing a mixture of acetaldehyde and a quantity of steam greater than that of the acetaldehyde employed at about 400° C. over a catalyst comprising zinc oxid.

11. The process of producing acetone, which comprises passing a mixture of acetaldehyde and a quantity of steam greater than that of the acetaldehyde employed at a temperature between about 350° and 500° C. over a catalyst containing zinc and another metal the acetate of which decomposes under the said conditions.

12. The process of producing acetone, which comprises passing a mixture of acetaldehyde and a quantity of steam greater than that of the acetaldehyde employed at a temperature between about 350° and 500° C. over a catalyst comprising zinc oxid and a compound of another metal the acetate of which decomposes under the said conditions.

13. The process of producing acetone, which comprises passing a mixture of acetaldehyde and a quantity of steam greater than that of the acetaldehyde employed at a temperature between about 350° and 500° C. over a catalyst comprising zinc oxid and aluminium oxid.

14. The process of producing acetone, which comprises passing acetaldehyde together with a gaseous mixture comprising steam and oxygen at a temperature between about 350° and 500° C. over a catalyst containing zinc.

In testimony whereof I have hereunto set my hand.

LEO SCHLECHT.